United States Patent [19]

Ferrari

[11] Patent Number: 5,150,837
[45] Date of Patent: Sep. 29, 1992

[54] BACKPACK SPRAYING EQUIPMENT

[76] Inventor: Alberto Ferrari, Gotra di Albareto (Parma), Italy, 43051

[21] Appl. No.: 542,935

[22] Filed: Jun. 22, 1990

[30] Foreign Application Priority Data

Jul. 28, 1989 [IT] Italy .................. 3570 A/89

[51] Int. Cl.⁵ .............................. B05B 9/08
[52] U.S. Cl. ........................ 239/153; 239/333; 239/152; 222/175; 222/325; 222/385
[58] Field of Search .............. 239/152, 333, 153; 222/175, 255, 325, 383, 385

[56] References Cited

U.S. PATENT DOCUMENTS

| 4,768,714 | 9/1988 | Luchsinger | 239/333 |
| 4,798,333 | 1/1989 | Luchsinger | 239/333 |
| 5,046,448 | 9/1991 | Crisafulli | 222/175 |

FOREIGN PATENT DOCUMENTS

67841 7/1966 Fed. Rep. of Germany.
590452 7/1947 United Kingdom ............. 222/255

Primary Examiner—Andres Kashnikow
Assistant Examiner—Lesley D. Morris
Attorney, Agent, or Firm—Darby & Darby

[57] ABSTRACT

In spraying equipment comprising a base, a tank mounted to the top of the base, and a manually operated pumping system transferring liquid from the tank to a compression chamber, the base, the seatings for the moving parts of the pumping system, and the ducts connecting the tank, pumping system and compression chamber are in a single block, and the pumping system comprises two identical piston pumps integral with the base, accommodated in respective recesses formed in the bottom of the tank at each side and operated in push-pull by a single hand lever hinged to the base; the compression chamber is insertable into the tank from above and secured to the base by its bottom end.

14 Claims, 7 Drawing Sheets

FIG 1

BACKPACK SPRAYING EQUIPMENT

BACKGROUND OF THE INVENTION

The present invention relates to backpack spraying equipment.

Equipment of the type in question comprises a base, at bottom, a tank containing the spraying liquid and secured to the top of the base, a compression chamber, connected by way of a pipeline to a spray lance, and a pump by which liquid is drawn from the tank and supplied to the compression chamber.

In the most familiar type of embodiment, the pump and compression chamber are coaxial and disposed internally of the tank, the piston of the pump being rigidly associated with the compression chamber and the cylinder rigidly associated with the tank. The pump is operated by a lever pivoted to the base and impinging directly or indirectly on the compression chamber by way of a connecting rod mounted externally of the tank; accordingly, the chamber is reciprocated repeatedly into and from the tank, retracting and extending as its movement is transmitted to the piston of the pump.

In this type of embodiment, the piston connecting rod is somewhat long, and a source of problems in ensuring an efficient seal between the different parts of the pump, not least between the tank and compression chamber. Difficulties with seals are aggravated further by the fact that the spraying liquids carried in the tank will often be abrasive or induce encrustation; accordingly, the materials used in construction must be especially resistant to such liquids. Moreover, it will be appreciated that the connecting rod or the piston rod operates continually under axial compression forces, and that such forces dictate certain minimal structural requirements in their turn. An additional problem encountered is that of the difficulty in servicing the various moving parts of the pump as a result of their being accomodated internally of the tank. Other designs of backpack spray equipment feature a pump that is disposed other than coaxially with the compression chamber and located externally of the tank, though here again the majority of the moving parts operate internally of the tank, immersed in the spraying liquid.

In another type of embodiment, the operating lever carries a pair of short arms articulated with the bottom ends of respective connecting rods, of which the top ends are articulated with the compression chamber operating the piston of the pump; in this design, problems associated with axial compression are overcome by eliminating the relative forces entirely, though one is still left with a similar number of moving parts operating immersed in the spray liquid.

Other designs feature location either of the pump or of the compression chamber externally of the tank and of the base, but with the obvious risk of damage to exposed parts through impact.

An embodiment also exists in which the compression chamber is integral with the tank, and the piston slides in a cylinder associated with the base of the tank.

Yet another type of embodiment features two pumps similar to those outlined above, of which the piston rods run substantially parallel the entire length of the tank and are operated by respective connecting rods disposed substantially parallel to them. Notwithstanding the compression chamber in this embodiment is located internally of the base, connected to the pump on the one hand and to the outlet pipeline supplying the lance on the other, problems deriving from the length of the connecting and piston rods and the axial compression forces to which they are subject remain markedly in evidence as in the former instances described.

One drawback common to all conventional backpack equipment is the absence of some facility whereby the operator can be advised of arrival at maximum permissible pressure internally of the compression chamber. Such a shortcoming is serious in nature, in view of the fact that the operator needs to keep the compression chamber substantially at maximum pressure in order to obtain maximum spray force at the outlet; consequently, the permissible limit is easily exceeded, and with clear risks in terms of damage.

Another drawback common to all designs of equipment thus far described relates to their cost, and more exactly, to the fact that one is denied the freedom to design models of different capacity utilizing the same components, as far as possible. In most of the conventional designs mentioned, in fact, the moving parts utilze the full height of the tank, so that an increase in capacity using the identical moving parts is possible only by increasing the transverse dimensions of the tank, which in turn signifies distancing the center of gravity of the tank from the operator and upsetting the balance of the entire pack.

Accordingly, the object of the present invention is to provide backpack spraying equipment affording economy in design, practical, simple and safe in use and easy to service.

SUMMARY OF THE INVENTION

The stated object is realized in backpack spraying equipment according to the present invention, which consists essentially in a base, a tank positioned on the top of the base, and a manually operated pumping system by which liquid is drawn from the tank and supplied to a compression chamber.

At least the base, the seatings (chambers, spaces) which accommodate the moving parts of the pumping system and the ducts connecting the tank, pumping system and compression chamber are designed as a single unit, and use is made of at least two identical piston pumps operated in push-pull by a single manual control pivotably associated with the base.

The compression chamber is insertable from above into the tank and connected by its bottom end to the base, whilst the pumps are fully integral with the base and accommodated in respective recesses formed in the lower part of the tank on each side.

Among the advantages of the present invention is that the adoption of two pump assemblies operating in push-pull not only improves continuity of the supply of liquid to the compression chamber (hence to the lance), but also permits proportioning of the dimensions of the single pumps in such a way as to obtain an increased level of pressure in the compression chamber per unit of effort applied by the operator, this in turn signifying a virtual absence of pulsation in the emerging jet of liquid and an ultimate improvement in atomization and spray pattern.

A further advantage afforded is that of swift, easy access to all component parts of the equipment, and therefore of troublefree servicing, given that the parts subject to wear are located in the bottom of the base and directly accessible.

Yet another advantage of the invention is the modular design and construction of the equipment, which permits of creating a plurality of models to suit varying requirements, as well as enabling a swift and simple modification of the controls (operating lever mounted Rx or Lx) without in any way affecting overall performance.

BRIEF DESCRIPTION OF THE DRAWINGS

The invention will now be described in detail, by way of example, with the aid of the accompanying drawings, in which.

DESCRIPTION OF THE PREFERRED EMBODIMENTS

With reference to the drawings, spraying equipment according to the present invention is of the type essentially comprising a base 1, a tank 2, a pump 3 and a compression chamber 4.

The tank 2 is positioned directly above the base 1 and connects with the inlet of the pump 3, which is connected in turn with the compression chamber 4 by way of its outlet.

According to the present invention, the base 1, the walls 5, 7 and 8 which afford seatings (chambers) 5s, 7a and 8a for the moving parts of the pump 3, together with the ducts 11 and 12 connecting the tank 2, the pump 3 and the compression chamber 4, are embodied as a single unit.

Figure 2:
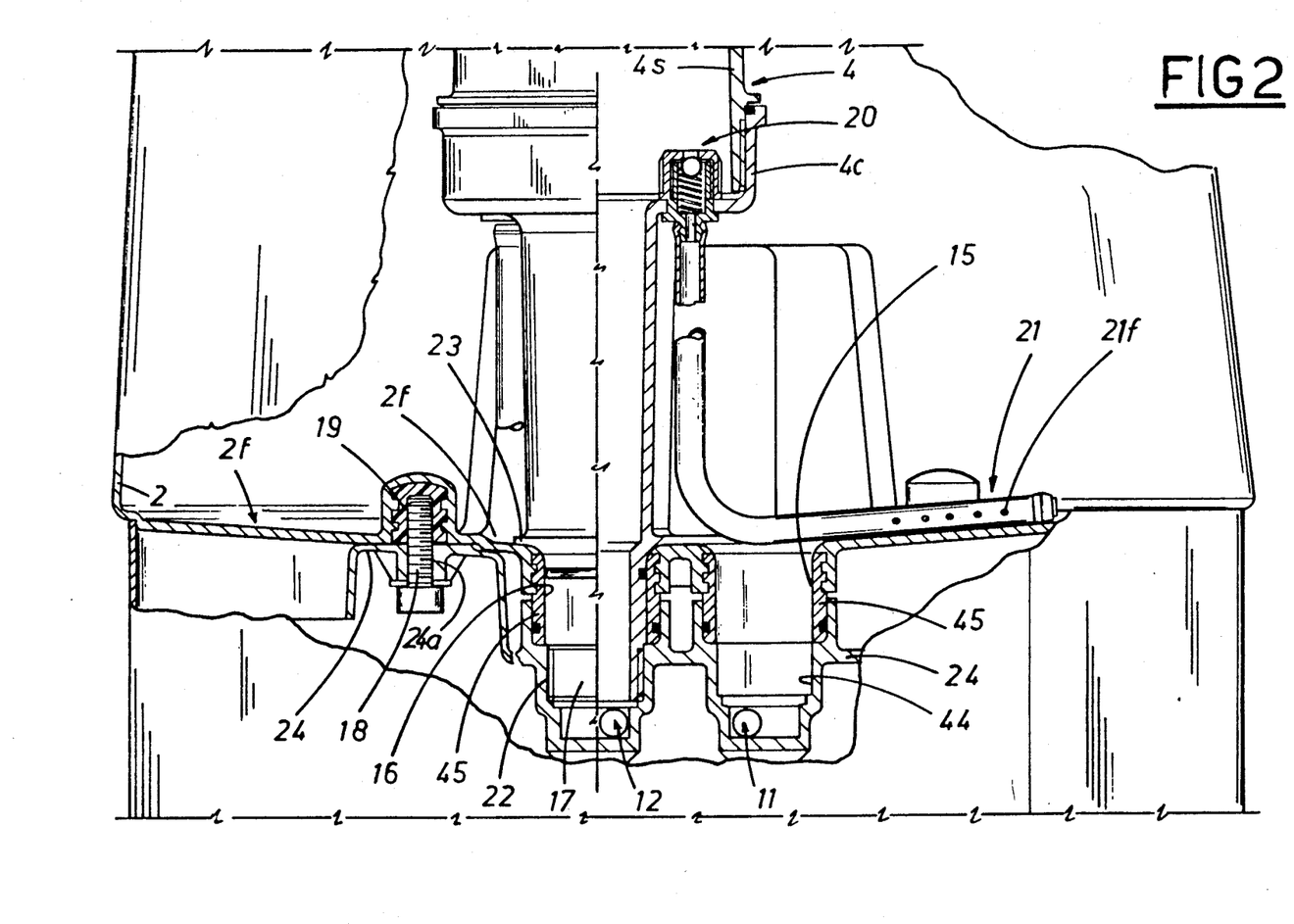
FIG. 2 illustrates the equipment of FIG. 1 in a longitudinal section taken through the compression chamber.
Figure 3:
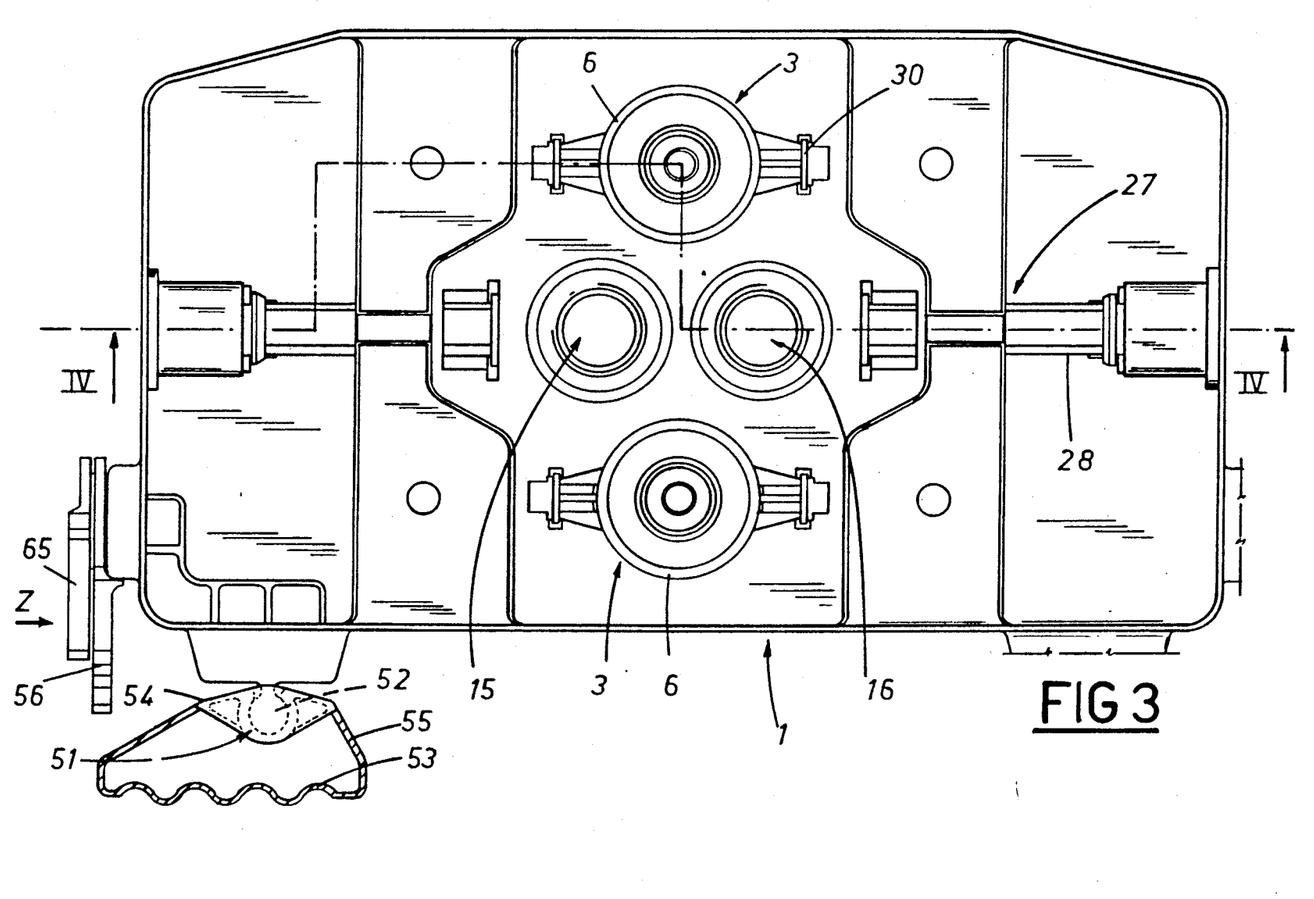
FIG. 3 shows a detail of the equipment of FIG. 1, namely the base, in a view from above.
Figures 4, 9:
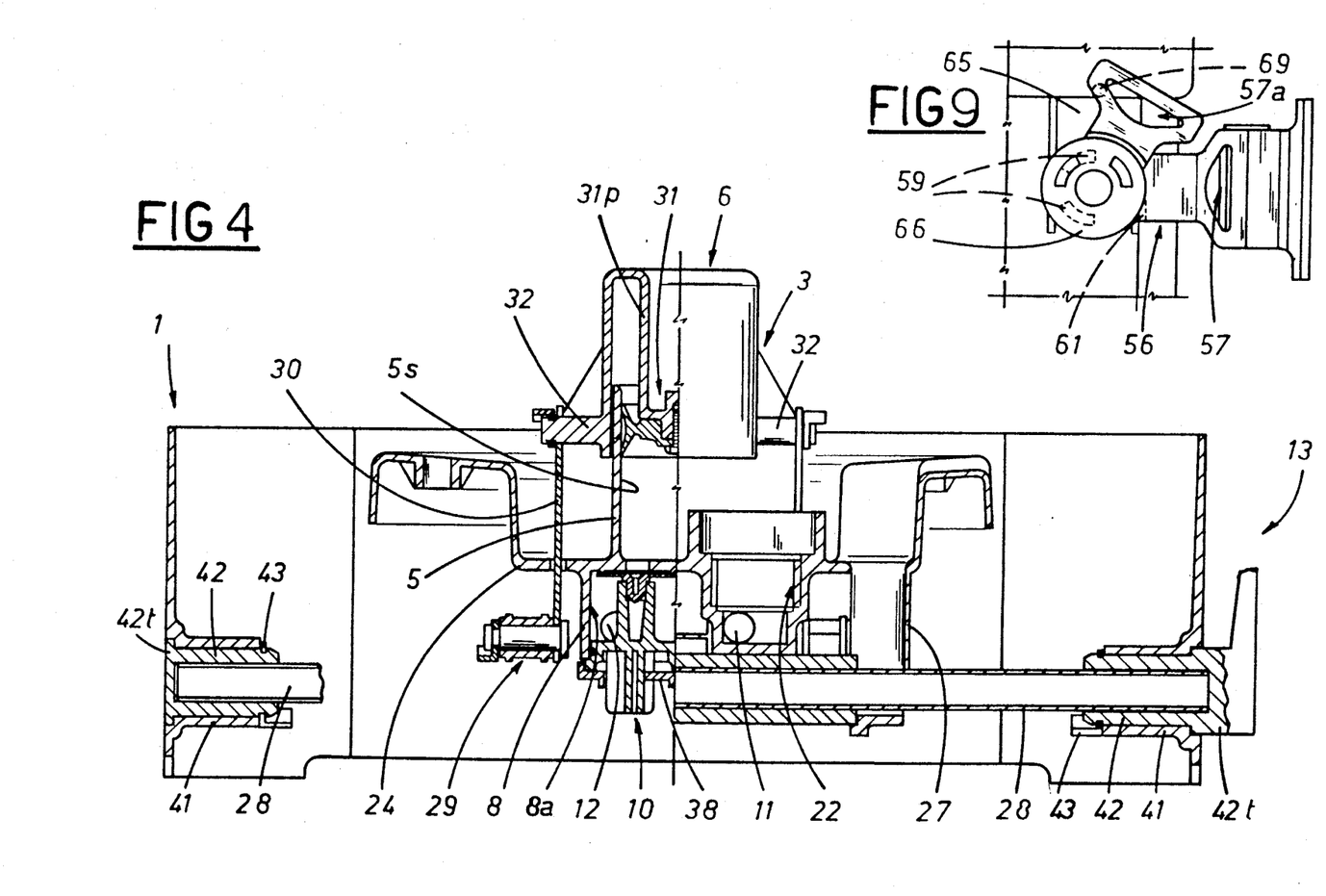
FIG. 4 is the section through IV—IV of FIG. 3.
FIG. 9 shows a detal of the base as viewed from Z in FIG. 3.
Figure 5:
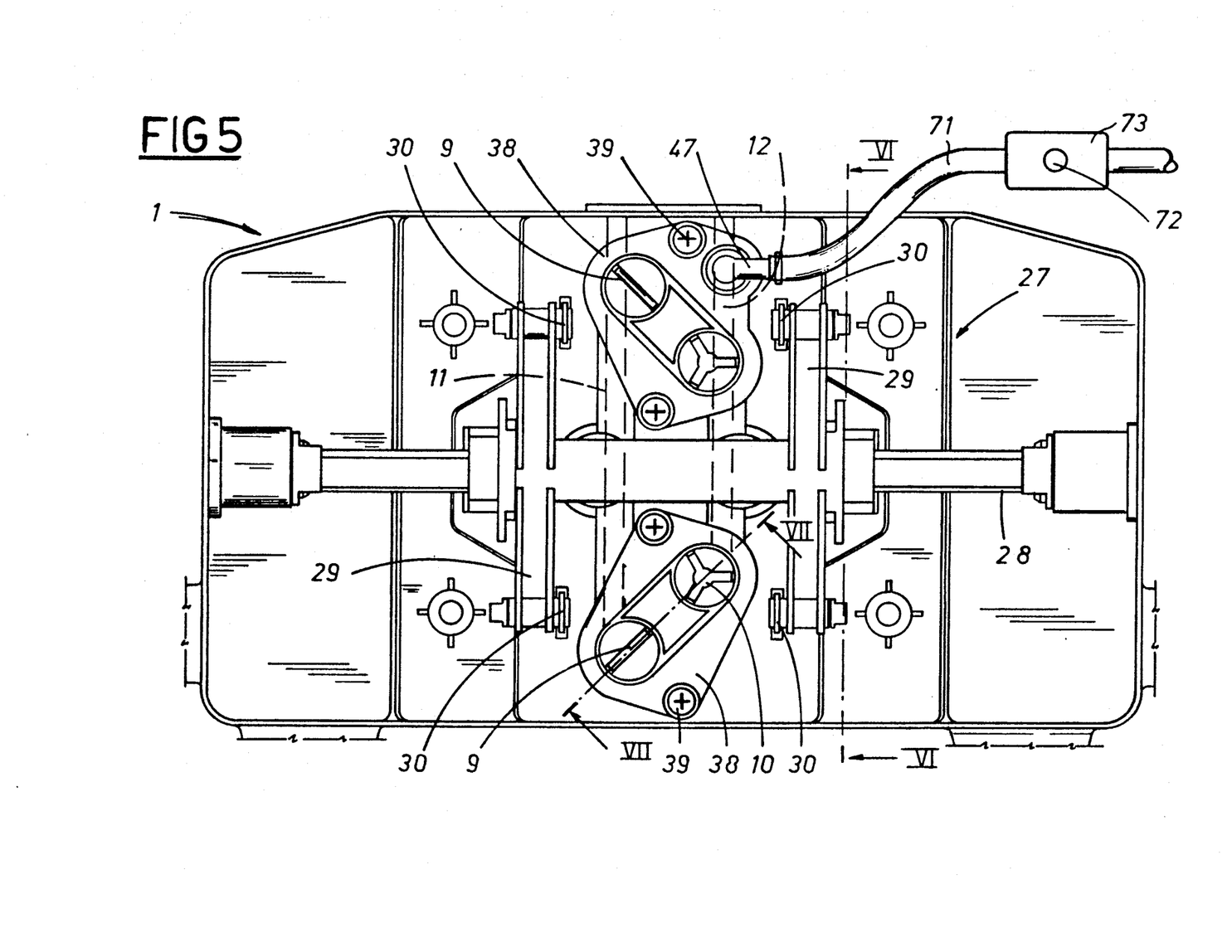
FIG. 5 illustrates the base of FIG. 3 in a view from beneath.

Moreover, the design of the disclosed equipment features two identical piston pumps 3 operated in phase opposition from a single manual control 13. Referring to FIGS. 2 . . . 6, the base 1 is fashioned in molded plastic material, exhibiting substantially rectangular hollow shape. 24 denotes a transversely disposed web (see FIG. 4 in particular) from which two cylindrical walls 5 extend upwards parallel one with another on the one side, and four cylindrical walls 7 and 8 extend downwards on the other side, likewise parallel with one another.

Figure 7:
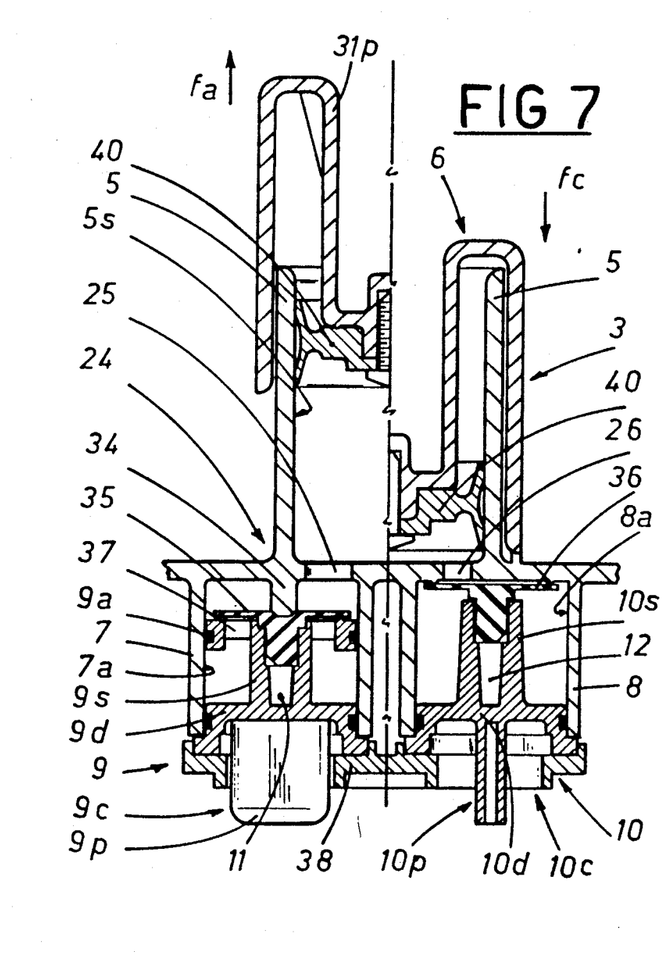

Each wall denoted 5 effectively constitutes the cylinder of one pump 3, whilst each pair of walls denoted 7 and 8 establish respective seatings 7a and 8a for the elements 9c and 10c of corresponding valves 9 and 10. As discernible in FIG. 7, there are two cylindrical walls 7 and 8 associated with each cylinder 5, beneath the web 24, and the web itself affords a plurality of holes 25 and 26 each located between the seating 5s afforded by the respective cylinder 5 and the seatings 7a and 8a afforded by the cylindrical walls 7 and 8 beneath. The end face of one of the seatings 7a or 8a, for example 7a in the case of FIG. 7, affords a central projection 34 integral with the base 1. Each valve element 9c and 10c consists substantially in a disk 9d and 10d, accommodated to a fluid-tight fit in the respective seating 7a and 8a, which exhibits a projecting support 9s, 10s on the one side carrying a relative diaphragm seal 35, 36 directed toward the end face of the seating 7a, 8a, and on the other, a manually operated element denoted 9p, 10p. The length of the supports 9s and 10s is dissimilar, in such a way as to position the relative diaphragm seal 35 and 36 respectively at a given distance from or in contact with the end face of the seating 7a and 8a, as illustrated in FIG. 7. The distance separating the seal denoted 35 from the end face of the relative seating 7a is established by the length of the projection 34, which prevents the seal 35 from blocking the hole 25 afforded by the end face of the seating 7a. The valve 9 in question further comprises an annular element 9a affording support to the diaphragm seal 35 and combining with the support 9s to create an annular passage 37. The seal denoted 36, by contrast, occupies a position normally in direct contact with the end face of the seating 8a and blocking the relative hole 26. Each valve element 9c and 10c is held in position and anchored to the base 1 by removable means such as a cover 38, impinging on the valves 9 and 10 itself, and screws 39 freely insertable through the cover and into the base 1 (see FIG. 5).

The piston 6 of each pump 3 consists in a bucket type element freely ensheathing the relative cylinder wall 5 (see FIG. 7), and exhibiting a dished center 31 by which a second cylindrical wall 31p is created internally of the cylinder wall 5; the stroking piston 6 thus completely encompasses the cylinder wall 5 both inside and outside. 40 denotes a seal secured to the unattached end of the internal wall 31p and engaged in sliding contact with the cylinder wall 5, which in effect produces the suction-compression action of the relative pump 3.

Observing FIG. 7, which illustrates the piston 6 in its limit positions, it will be seen that the seal denoted 35 constitutes a part of the suction valve, raised as it is by the annular element 9a in such a way as to leave the annular passage 37 free when the piston 6 is distanced from the web 24, whereas the remaining seal 36 forms a part of the pressure valve, opening the relative hole 26 under the force of the piston 6 moving toward the web 24.

32 denotes one of two pins associated with each piston 6, occupying diametrically opposed positions on either side of the piston axis and articulated with one end of a connecting rod 30, of which the remaining end is articulated with one end of a respective rocker arm 29.

Figure 6:
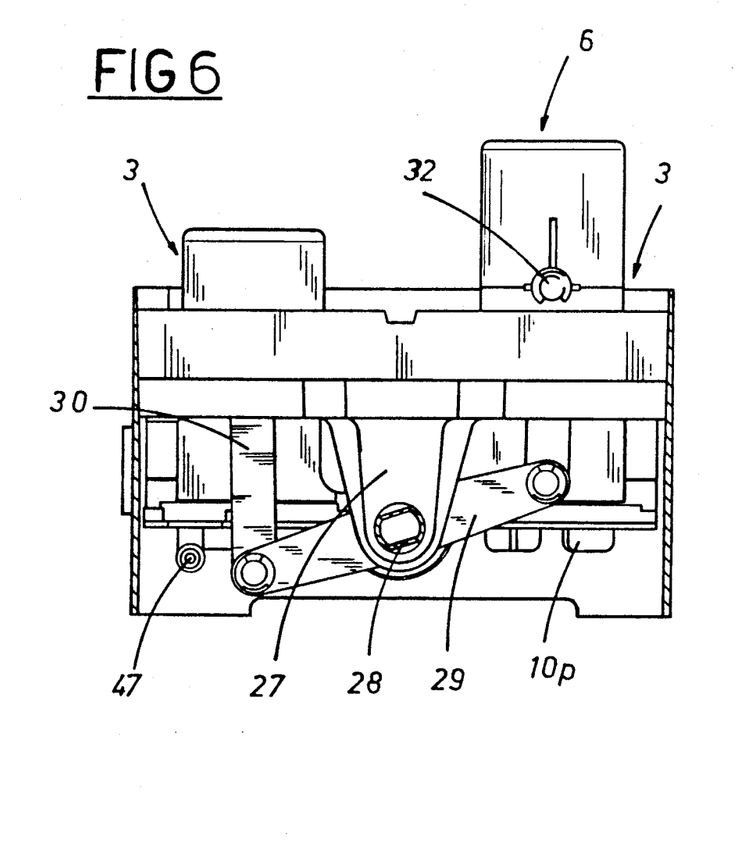
FIGS. 6 and 7 are the respective sections through VI—VI and VII—VII in FIG. 5.

As discernible from FIG. 6, the equipment comprises two straight rocker arms 29 keyed at mid-point to a bar 28 carried by a pair of brackets 27 integral with and projecting downwards from the web 24, and articulated with the two connecting rods 30 linked to the two pins 32 of each piston 6. Thus arranged, the rocker arms 29 are able to draw one piston 6 toward the web 24 while distancing the remaining piston 6 at the same time: in short, the pistons 6 operate in push-pull.

The bar 28 is disposed at right angles to the plane occupied by the axes of the cylinder walls 5, its ends projecting from or near to the wall of the hollow base 1. As discernible from FIG. 4, each end of the bar 28 is inserted into a corresponding sleeve 41 afforded by the base 1, and more exactly, into an antifriction bearing 42 made secure in removable fashion, for example by embodying one of its ends with a boss 42t and the remaining end with a groove to receive a quick release snap ring 43. The boss 42t of the one bearing 42 remains flush with the base 1 whilst the boss of the other projects and extends radially into a lever 13 providing a manual control by way of which to operate the pistons 6. 22 and 44 denote seatings afforded by the web 24, coinciding sustantially with the plane occupied by the axis of the bar 28, which are in communication via relative ducts 11 and 12 with the seatings 7a and 8a of the two valves 9 and 10, respectively. Thus, the pumps 3 operate in parallel to the same rise in pressure; needless to say, operation might equally well be in series, with the outlet of the one connected directly to the inlet of the other in such a way as to split the increment between the two, though the parallel connection has the effect of reducing the force required for operation, i.e., of increasing the pressure of liquid delivered by each pump 3 per unit of force applied manually on the part of the operator.

Figure 1:
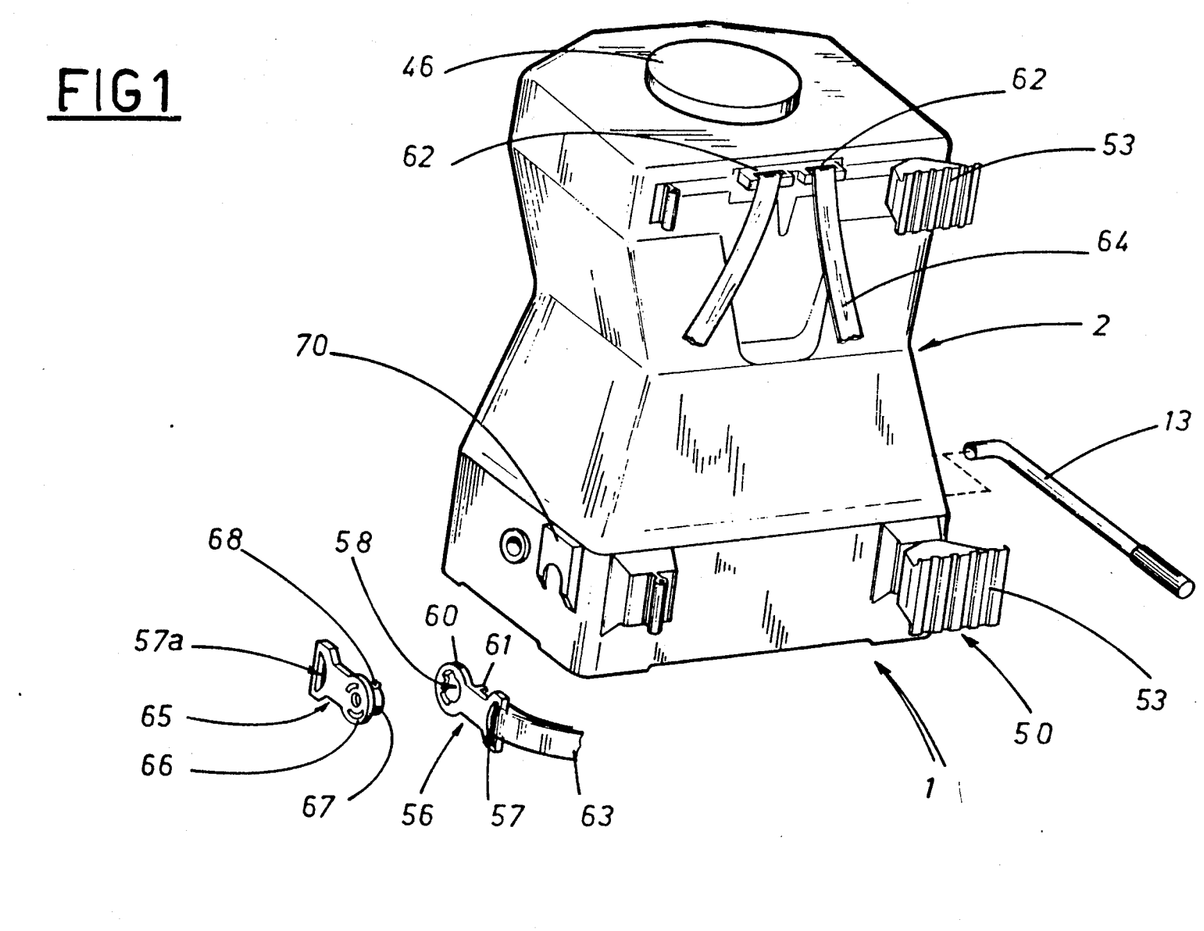
FIG. 1 shows a perspective of backpack spraying equipment according to the present invention.

The tank 2 is a sealed unit, and its shape matched to that of the base 1 such that the one appears merged to the other. The bottom 2f of the tank 2, or rather the face offered to the base 1, is shaped so as to ensure a precise match between the two parts, as illustrated in FIGS. 1 and 2. According to the invention, the tank 2 and base 1 are fastened together by removable means 18 and 19 that do not pass through the tank 2; in the example of FIG. 2, such means 18 and 19 consist respectively in a screw passing freely through a lug denoted 24a integral with the web 24 and offered flush to the bottom 2f of the tank 2, and an internally threaded insert embedded in the tank molding so as to form an integral part of the bottom 2f without passing through.

The bottom 2f of the tank affords two holes 15 and 16 coaxial with the seatings 22 and 44 afforded by the web 24, and two unions 45, coinciding with the two holes 15 and 16, which are insertable in the seatings 22 and 44 to a fluid-tight fit.

Figure 8:
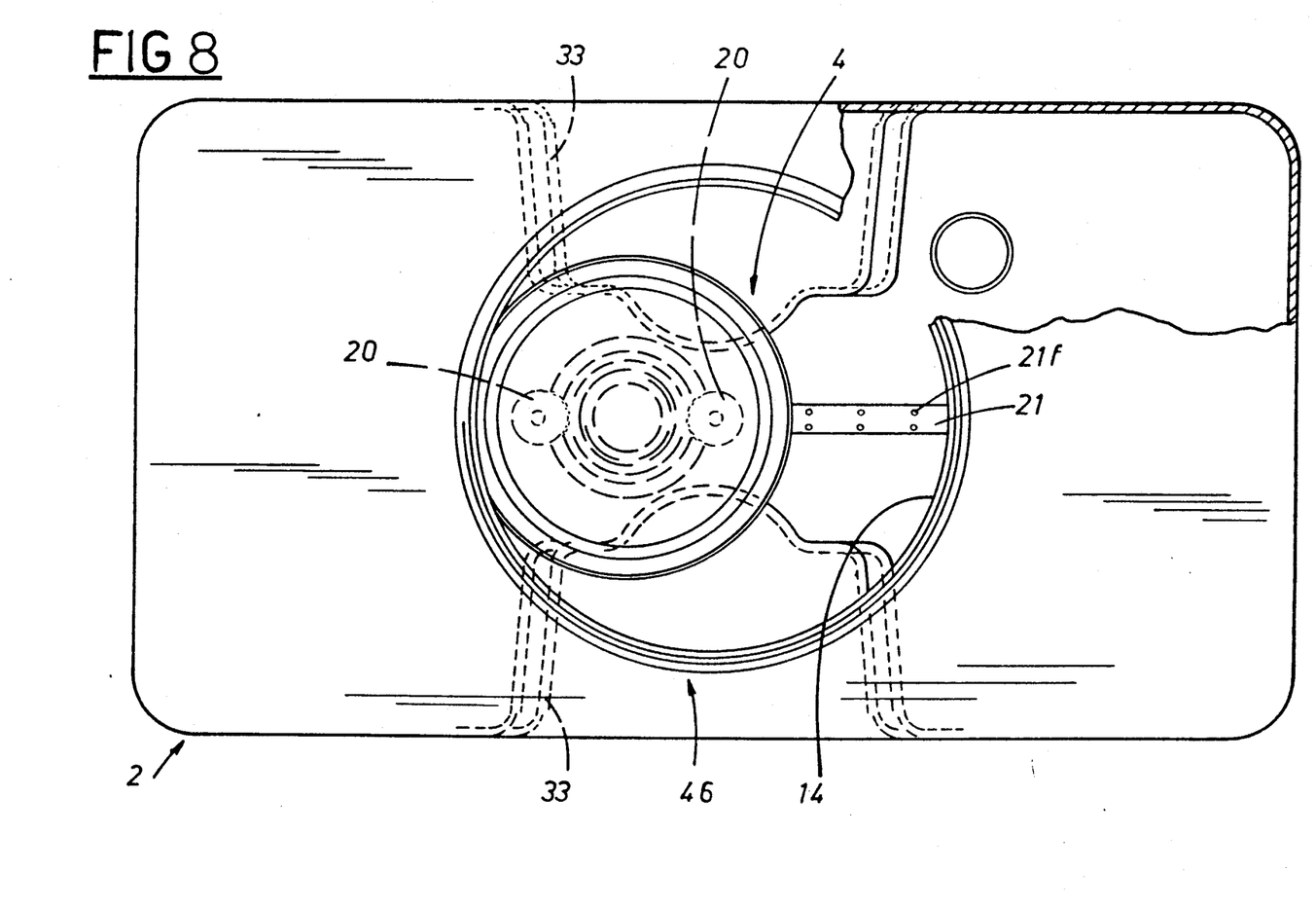
FIG. 8 shows the equipment of FIG. 1 from above with certain parts cut away better to reveal others.

Referring to FIG. 8, the tank 2 also affords a top opening 14 of dimensions such as to allow passage of the compression chamber 4, and two lower lateral recesses 33. The opening 14 is capped and sealed by a relative cover 46, of which the sealing action need serve only to avoid spillage of the liquid from the tank 2; the recesses 33 are positioned to coincide with the pistons 6, and proportioned such that the pistons are freely accommodated.

The compression chamber 4 is embodied in two parts, a bottom section 4i and a top section 4s, fastened coaxially in a fluid-tight fit and separable one from the other, for example by screw threads.

The top section 4s is of bucket type embodiment and of dimensions such as to allow its passage through the top opening 14 of the tank 2.

The bottom section 4i exhibits two stretches of dissimilar diameter, of which the lower and smaller diameter stretch is hermetically insertable into and removable from the seating denoted 22, e.g. in a screw fit, by way of its bottom end 17 (FIG. 2).

This same lower stretch of the bottom section 4i exhibits a peripheral bead 23 designed to register with the bottom 2f of the tank 2 when the bottom end 17 is screwed down into the seating 22 and thus provide an additional means of securing the tank 2 to the base 1 (see FIG. 2).

The compression chamber 4 is connected directly and permanently by way of a duct (not illustrated) with a nozzle 47 (FIG. 5) embodied separately and mounted to one of the covers 38 of the valve seatings 7a or 8a. Connected in turn to the nozzle 47 is one end of a pipeline through which the liquid held under pressure in the chamber 4 is supplied to a spray gun or lance (not illustrated). The option exists of installing pressure control means on the outlet line from the nozzle 47, e.g. on the pipeline 71 to the lance, consisting in a regulator 73 adjustable by way of a relative knob 72 and serving to select the outlet pressure best suited to the operation in hand and to the characteristics of the liquid.

The compression chamber 4 is connected with the inside of the tank 2 through one-way, adjustable shut-off means 20, illustrated in FIG. 2 as a ball check valve allowing passage of liquid from the compression chamber 4 to the tank 2.

It is an additional feature of equipment according to the invention that the outlet port of the check valve 20 connects with one end of a pipeline 21 that is stopped at the remaining end, pierced with a plurality of radial holes 21f, and disposed with a certain length of the stopped end offered all but in contact to the bottom 2f of the tank.

To advantage, at least two check vlaves 20 will be installed, with relative pipelines 21.

The equipment is provided further with backpack type carrying means consisting in two pairs of removable stays 50, fitted to the base 1 and to the top part of the tank 2, respectively. More exactly, each stay is fashioned in molded plastic (FIG. 3) and affords an open-sided cylindrical female member or socket 51, incorporated into a core piece 54 at the rear, which is designed to fit over a matching cylindrical pin 52 functioning as the corresponding male member and rigidly associated with the base 1 or tank 2, preferably as an integral part of the relative molding.

The front part of the stay 50 is provided with a ridged surface 53 and united with the core piece 54 by way of side pieces 55 in such a way as to create a flexible support capable of adapting in the best manner possible to the back of the wearer. To this end, the stay is molded asymmetrically in relation to a vertical median plane passing through the core piece 54, in such a way as permits rotation of through 180° from the position illustrated in FIG. 3 and thus of altering the distance between centers of support at the top and/or bottom of the pack. Moreover, with the equipment resting against the back of the wearer at a limited number of points, the pumping system remains ventilated continously on all sides.

Thus supported, the equipment is secured to the operator's person by waist and shoulder straps, denoted 63 and 64 respectively. The waist strap is attached to the base 1 on either side by means of a first clip 56 consisting in a tongue with a slot 57 at the forward end to receive the strap, and a circular boss 60 at rear affording a hole 58 with two notches 59 directed to the rear and terminating coincidently with the transverse diameter of the boss 60. The clip 56 also exhibits a tranverse rib 61 at mid-point along the tongue.

The shoulder straps 64 are made fast uppermost to corresponding hooks 62 afforded by the tank 2, and at bottom to a second clip 65, identical to the first save for the embodiment of the boss 66, which incorporates a pivot 67 projecting from the plane occupied by the tongue and furnished with a pair of diametrically opposed teeth 68. The tongue also affords a pin 69 issuing from the edge of the slot end 57a farthest to the rear when fitted (FIG. 9). 70 denotes an anchorage associated with each side of the base 1 (see FIG. 1), affording a downwardly directed opening proportioned to accommodate the boss of the first clip 56. The clips fit together in simple fashion by virtue of the particular type of embodiment described above; as discernible from FIG. 1, the teeth 68 of the second clip 65 are inserted into the notches 59 of the first, and the assembled clips inserted into the anchorage 70; this done, the second clip 65 is rotated clockwise through an angle greater than 90° so as to assume the position of FIG. 9, in which the pin 69 snaps over the side edge of the anchorage 70 to rest on the top edge, thereby lending stability to the coupling inasmuch as the teeth 68 of the second clip are prevented from escaping by the boss 60 of the first clip and by the internal wall of the anchorage 70.

As regards the materials used in embodiment, by way of example, the base 1 could be in molded plastic, the tank 2 fashioned in transparent plastic so as to permit of viewing the level of its contents, and the bar 28, the connecting rods 30 and the control handle 13 in metal, all such materials possessing the requisite resistance to chemical attack from the spraying liquids.

Operation of the spraying equipment thus embodied will now be described.

Having filled the tank 2 with liquid by way of the top opening 14, the operator works the lever 13 to rotate the bar 28 back and forth in alternation above its own axis. Assuming the two pumps 3 to be connected in parallel, the movement of the bar 28 produces a suction stroke in the one pump 3 (see arrow fa, FIG. 7), and simultaneously, a compression stoke in the other pump 3 (arrow fc, FIG. 7), as apparent also in FIG. 6. Liquid is thus drawn from the tank 2 down by way of the hole denoted 15 into the relative seating 44 afforded by the web 24, thence through the duct 11 into the seating 7a of the valve 9, below the diaphragm seal 35. Movement of a piston 6 in the suction direction fa has the effect of evacuating the relative seating 5s, with which the valve seating 7a is connected by way of the hole denoted 25; the diaphragm 35 is lifted as a result, and liquid can pass into the seating 5s. Subsequent movement of the piston 6 in the opposite direction fc has the effect of pressurizing this same seating 5s and thus closing the inlet valve 9, i.e. lowering the diaphragm 35 and blocking the annular passage 37, and opening the outlet valve 10 by lowering the relative diaphragm 36 and exposing the hole denoted 26. Liquid now passes through the duct 12 and into the seat 22 afforded by the web 24 and utilimately, into the compression chamber 4. The process continues in this manner until the pressure level of the liquid in the compression chamber 4, initially full of air which is compressed in the manner of a spring, matches the pressure setting of the check valves 20, at which point these selfsame valves 20 will open and return part of the pumped liquid from the chamber 4 back into the tank 2. According to the invention, this unloaded liquid is ejected from the holes 21f of the relative pipe 21 at substantially the same pressure as exists in the chamber 4, thereby occasioning a vigorous agitation of the liquid contained in the tank 2.

The valves thus perform the dual role of preventing sedimentation in the tank 2 and relieving pressure in the compression chamber 4. In effect, the tank 2 is not a pressurized enclosure, and as long as the chamber 4 remains sealed, continued operation of the lever 13, hence of the pumps 3, does no more than recirculate liquid from the tank 2 through the pumps 3 to the chamber 4, and from the chamber back to the tank 2 by way of the relief valves 20.

The structure of spraying equipment according to the present invention affords significant economic advantages to manufacturer and purchaser alike, as the capacity of the tank can be varied without replacing the entire pumping system. In addition, manufacturer distributor are benefited by the facility of holding a smaller stock of parts, which will be interchangeable regardless of the capacity of the tank. In most cases, in fact, the components most subject to wear and damage, i.e. moving parts, are all identical.

The adoption of a design with two identical pumps operating in parallel enables a notable reduction in the effort required on the part of the operator, inasmuch as with one pump compressing and the other expanding at any given moment, the forces in play are balanced to an advantageous degree.

The advantages of the spraying equipment according to the invention may be summarized thus:

centrally positioned pumping system;

centrally positioned, large capacity compression chamber with high pressure capability;

continuity in supply of liquid from pumping system to compression chamber;

continuity in supply of liquid to the spray lance, producing enhanced atomization, and higher delivery pressure;

doubled swept volume afforded by pumping system, giving increased delivery pressure per unit of effort applied;

incorporation of pressure relief control/valve facility and hydraulic agitator in one feature;

practical valve layout, enabling easy cleaning and/or replacement of pumping system from outside with no need to strip down equipment;

option of left handed or right handed control using a single lever mounted in interchangeable positions;

efficient sealing action provided by the entire equipment;

ergonomic design.

What is claimed is:

1. Backpack spraying equipment, comprising:
   a base;
   a tank for holding a liquid to be sprayed, said tank, affording a filler opening uppermost and a first and a second hole at the bottom, said tank being mounted onto and secured to the base by means that are separable and do not penetrate the tank itself;
   a pump system including two piston pumps of identical embodiment associated entirely with the base, the inlet of at least one said pump being connected with the interior of the tank by way of the first bottom hole, and said pumps being mounted for reciprocation in phase opposition;
   a single manual control articulated with the base for reciprocating said pumps;
   a compession chamber, insertable into the tank by way of the filler opening, and sealably accommodated at bottom by the second bottom hole of the tank, and sealably and removably secured to the base, and connected both to the outlet of the pumping system for receiving output of said pumps in operation and to the tank;
   a plurality of elements for seatings to accommodate moving parts of the pumping system, and for connecting the tank, pumping system and compression chamber, said plurality of elements being embodied together with the base as a single unit.

2. Spraying equipment as in claim 1, wherein the compression chamber connects with the interior of the tank through an adjustable one-way check means set table to respond when a given maximum permissible pressure level is reached internally of the compression chamber.

3. Spraying equipment as in claim 2, wherein the outlet of the one-way check means is connected to one end of a stopped pipeline terminating all but in contact with the bottom of the tank at the other stopped end, said pipeline having a plurality of radial outlet holes.

4. Spraying equipment as in claim 1, wherein the compression chamber is embodied in two coaxial sections sealably and separably secured one to the other, said compression chamber comprising a top section enclosed uppermost, and a bottom section passing through the tank by way of the first bottom hole, the lower end of said bottom section being sealably and removably secured in a corresponding seating in the base and connecting with the outlet of at least one of the two pumps, and having a circumferential bead placed to contact an area of the bottom of the tank surrounding the first bottom hole, additional means being provided by which to secure the base and the tank one to the other.

5. Spraying equipment as in claim 1, wherein the base is substantially tubular and divided into upper and lower parts by a web, and comprises:
 two cylindrical walls extending upward from the web, constituting the cylinders of the pumps, and four cylindrical walls extending downward from the web to provide seatings internally of which the valve elements of the pumps are accommodated and removably secured;
 a plurality of holes afforded by the web and connecting the cylinder created by each upper cylindrical wall with the seatings afforded by a corresponding pair of lower cylindrical walls;
 at least two brackets projecting downward from the web and rotatably supporting a bar, transversely disposed with its opposed ends terminating close to or projecting from the tubular confines of the base, the manual control being rigidly and removably secured to said bar;
 at least one rocker arm rigidly associated with the transverse bar, exhibiting a rectilinear axis and articulated at each end with the bottom ends of respective connecting rods passing through the web and articulated at their top ends with the pistons of the pumps, in such a way that the pistons are stroked in phase opposition.

6. Spraying equipment as in claim 5, wherein the piston of each pump comprises:
 a bucket element freely ensheathing the respective cylinder and exhibiting a dished center that forms a substantially cylindrcial internal wall capable of movement within the cylinder, the projecting end of said bucket element being sealably enclosed and slidable in fluid-tight association with the internal surface of the cylinder;
 two diametrically opposed pins issuing from the bucket element, to which the two corresponding connecting rods are pivotably secured.

7. Spraying equipment as in claim 5, wherein the tank affords two lateral recesses at bottom creating respective seatings, externally isolated from the tank enclosure, in which the pistons of the pumps are freely accommodated.

8. Spraying equipment as in claim 1, wherein the pumps are connected in parallel.

9. Spraying equipment as in claim 1, wherein the pumps are connected in series.

10. Spraying equipment as in claim 1, wherein the single unit including the base, the elements affording seatings for the moving parts of the pumping system and connecting the tank, pumping system and compression chamber, is molded from plastic material.

11. Spraying equipment as in claim 1, wherein the base and the tank afford backpack type carrying means including two pairs of removable stays positioned respectively at the base and at the upper part of the tank, each stay being formed of plastic material and having an open-sided and rearwardly directed cylindrical socket that is incorporated into a core piece, said socket being dimensioned to fit over a matching cylindrical pin rigidly associated with the base or tank and functioning as a male counterpart.

12. Spraying equipment as in claim 11, wherein the stay includes a ridged surface at front, said ridged surface being connected with the core piece by way of said pieces to afford a flexible support.

13. Spraying equipment as in claim 12, wherein the stay is embodied asymmetrically in relation to a median plane passing vertically through the core piece to permit selecting between two positions rotated 180° one from the other.

14. Spraying equipment as in claim 1, wherein the backpack is secured to the person of the operator by an arrangement comprising:
 waist straps attached to the base one at each side, by means of a first clip having a tongue with a slot at the forward end to receive the associated strap, and a circular boss at rear with a hole with two notches directed to the rear and terminating coincidentally with the transverse diameter of the boss, and a transverse rib at mid-point along its length;
 shoulder straps made fast uppermost to respective hooks on the tank, and at bottom to a second clip, similar to the first, of which the boss incorporates a pivot projecting from the plane occupied by the tongue and furnished with a pair of diametrically opposed teeth, and the forward end affords a rearwardly located pin;
 two anchorages, each associated with one side of the base and having a downwardly directed opening, and proportioned to accommodate the first clip, such that when the teeth of the second clip are inserted into the notches of the first, and the assembled clips offered to the anchorage, the second clip can be rotated in relation to the first through an angle at least greater than 90° such that the pin registers with the top edge of the anchorage.

* * * * *